United States Patent

[11] 3,568,975

| [72] | Inventors | Frank E. Obermaier<br>Park Ridge;<br>Arthur A. Scott, Prospect Heights, Ill. |
|---|---|---|
| [21] | Appl. No. | 710,927 |
| [22] | Filed | Mar. 6, 1968 |
| [45] | Patented | Mar. 9, 1971 |
| [73] | Assignee | Eaton Yale & Towne Inc. |

[54] BUTTERFLY FLUID FLOW VALVE
4 Claims, 4 Drawing Figs.

[52] U.S. Cl. .................................................. 251/58, 251/306, 251/308
[51] Int. Cl. .................................................. F16k 31/16, F16k 1/226
[50] Field of Search .................................................. 251/306, 308, 305, 58

[56] References Cited
UNITED STATES PATENTS

| 3,442,488 | 5/1969 | Adams | 251/305 |
| 1,588,445 | 6/1926 | Chandler | 251/308 |
| 1,744,798 | 1/1930 | Price | 251/305X |
| 2,059,687 | 11/1936 | Gagg | 251/308X |
| 2,296,213 | 9/1942 | Kretzschmar | 251/58X |
| 2,772,850 | 12/1956 | Eaton | 251/306 |
| 2,923,523 | 2/1960 | Taylor | 251/306X |
| 3,029,063 | 4/1962 | Moen | 251/306 |

*Primary Examiner*—Arnold Rosenthal
*Attorney*—Hill, Sherman, Meroni, Gross & Simpson ABSTRACT: A vacuum actuated butterfly fluid flow valve including a valve body having a cylindrical bore formed therein between fluid inlet and outlet connections, a leakproof butterfly valve plate mounted within the bore on a rotatable operating rod and a vacuum motor having an operating member connected to the operating rod for rotating the rod and the valve plate upon actuation of the vacuum motor.

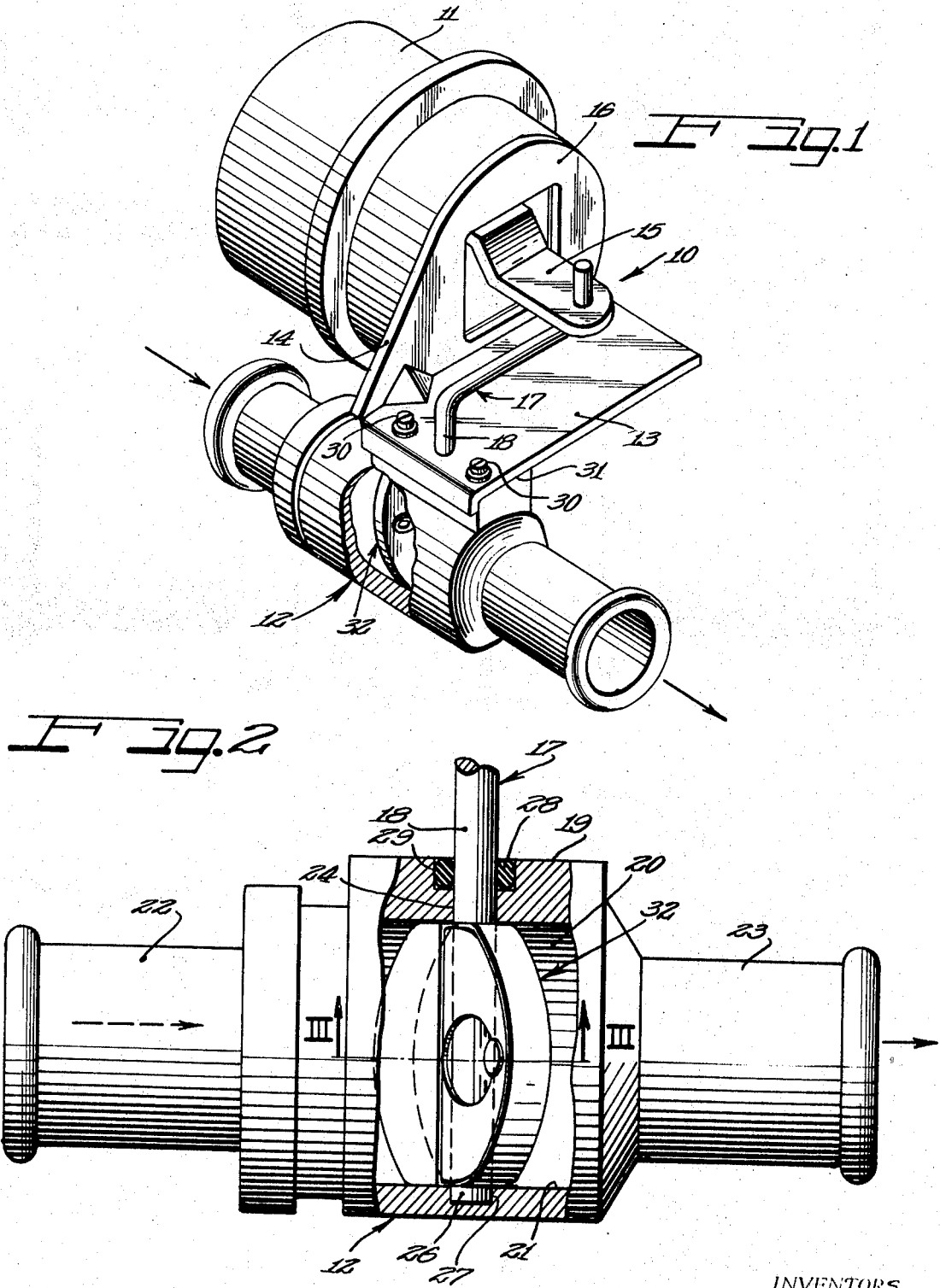

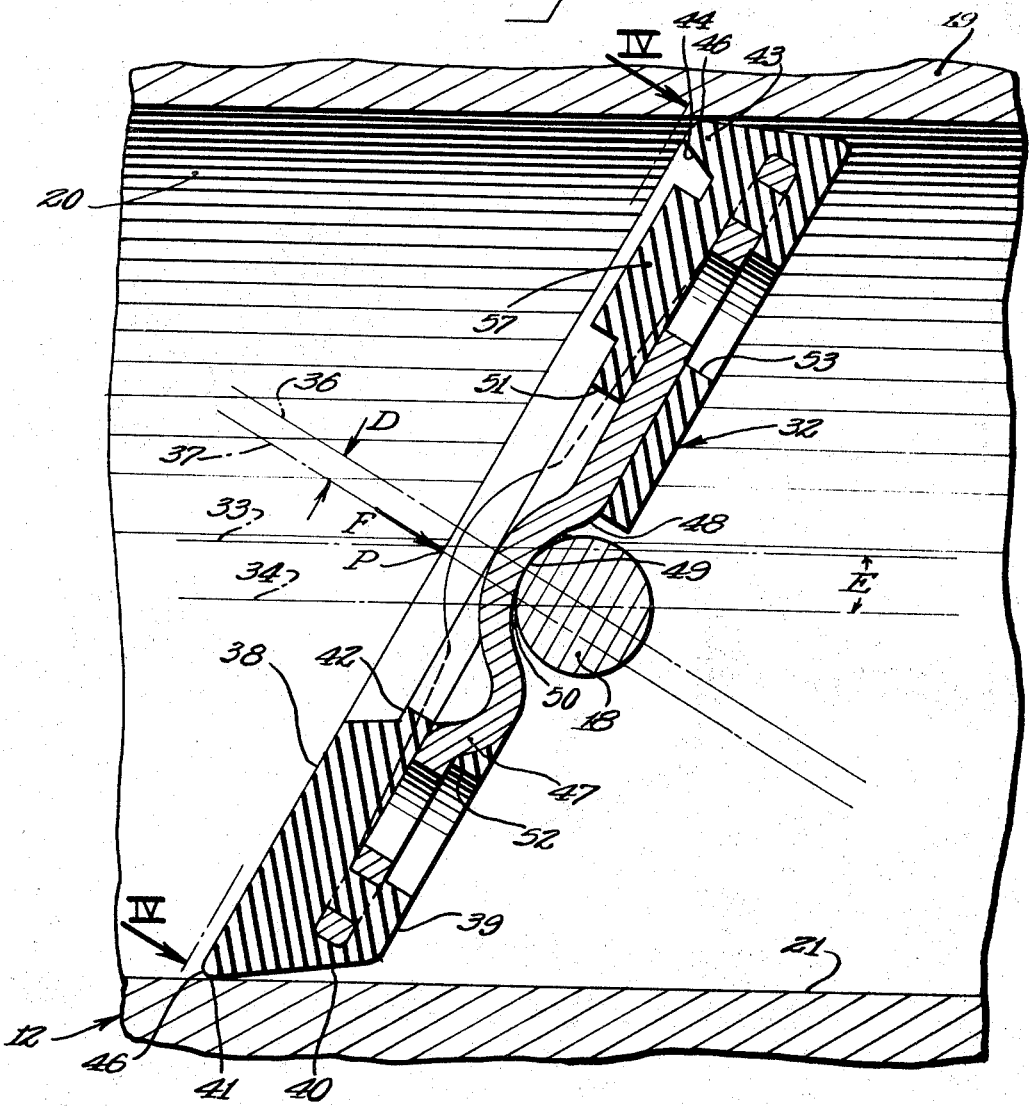

BUTTERFLY FLUID FLOW VALVE

BACKGROUND OF THE INVENTION

This invention relates generally to fluid flow valves and more particularly to vacuum actuated butterfly valves.

Butterfly valves having disc-shaped butterfly valve plate rotatable between open and closed positions about an axis in the bore of a valve body are generally known in the prior art. Valves of this general description are employed in a variety of applications because of their straight flow-through construction, resulting in reduced resistance to flow in the open position, and their excellent dirt handling characteristics.

Such prior art valves have certain drawbacks, however, which render their use in a wider range of applications unsatisfactory.

For example, butterfly valves are not highly leakproof and even in instances where the valve is motorized to provide substantial closing forces the problem of leakage generally exists, to a greater or lesser degree depending upon the particular fluid involved, fluid pressure, etc. Consequently in applications which require virtually no leakage trough the valve a butterfly valve is generally considered inappropriate.

The present invention, on the other hand, confers upon butterfly valves the ability to close tightly to avoid leakage even when the valve is actuated manually or by a relatively weak power mechanism, and thus substantially increases the number of applications to which butterfly valves can be put.

SUMMARY OF THE INVENTION

In view of the foregoing it is an object of the present invention to provide an improved butterfly valve capable of complete fluid flow shutoff over a wide range of fluid pressures while requiring only moderate operating power available, for example, from a small low-pressure vacuum motor.

To this end the present invention may be briefly summarized as comprising a butterfly fluid flow valve assembly including a valve body having a fluid inlet and a fluid outlet, a cylindrical bore between the inlet and the outlet, an operating rod extending transversely through the bore and journaled for rotation on the valve body and a disc-shaped valve plate mounted on the operating rod within the bore for rotation with the rod between a closed position, at which the valve plate blocks flow between the inlet and outlet, and an open position, at which a plow path is established.

Certain improved features of the invention reside in the disposition of the valve plate in the bore, the location of the operating rod with respect to the valve plate and certain configurative relationships of portions of the valve plate which render the same leak proof and which reduce wear and provide for a long operating life of the valve.

Another object of the invention is to provide a butterfly valve having exceptional valving characteristics while requiring only moderate closing forces so as to enable the valve to be actuated, for example, by a small low-pressure vacuum motor.

Another object is to utilize fluid pressure when the valve plate is closed to assist in sealing between the valve plate and the bore wall of the valve body.

Many other features, advantages and additional objects of the present invention will become manifest to those versed in the art upon making reference to the detailed description which follows and the accompanying sheets of drawings, in which preferred structural embodiments incorporating the principles of the present invention are shown by way of illustrative example only.

BRIEF DESCRIPTION OF THE DRAWING

FIG. 1 is a perspective view of a vacuum-actuated butterfly fluid flow valve assembly constructed in accordance with the principles of the present invention with a portion of the wall of the valve body cut away to show the valve plate therewithin.

FIG. 2 is an elevational view of the butterfly valve shown in FIG. 1 with a portion of the wall of the valve body cut away.

FIG. 3 is an enlarged fragmental cross-sectional view of the valve plate mounted on the operating rod in the bore of the valve body and taken along lines III–III of FIG. 2.

Fig. 4 is an elevational view of the valve plate as viewed along the lines IV–IV of FIG. 3 but reduced in size.

DESCRIPTION OF THE PREFERRED EMBODIMENT

In FIG. 1 a motorized butterfly fluid flow valve assembly constructed in accordance with the principles of the present invention is indicated generally at reference numeral 10. The specific disclosure has particular utility in association with automobile heater and cooling systems for completely shutting off the flow of coolant through the core or coil of the heater when the air conditioning system is adjusted to provide maximum cooling. The assembly 10 includes a vacuum motor 11 for actuating the valve and may be conveniently connected, in automobile heating-cooling systems, to the intake manifold or other suitable vacuum connections on the engine in the manner of other vacuum-operated accessories, components and the like.

Although the illustrated embodiment is highly suited for application in automobile heating-cooling systems it will be apparent as this description proceeds that the invention finds utility in numerous applications, for which butterfly valves were heretofore considered unsatisfactory.

Other components of the assembly 10 comprise a butterfly valve 12 mounted on a bracket 13 which is fastened to the body of the vacuum motor 11 by a mounting flange 14.

The illustrated embodiment of the vacuum motor 11 is of the spring-biased diaphragm type and is adapted with suitable connectors for connection to the intake manifold of an automobile engine. In this particular application the principles of the present invention find particular utility since (1) the valve 12 must be able to close to a no-leakage condition in order to obtain optimum air conditioning results at a maximum cooling condition, and (2) the power available to operate the valve 12 is limited since the pressure in the intake manifold is a relatively low vacuum and because the vacuum motor 11 itself should be kept as small as possible to satisfy current automobile design criteria.

The operating member of the vacuum motor 11 comprises an arm 15 which projects from a front end 16 of the vacuum motor and which reciprocates in response to variations in pressure applied to the vacuum motor. The arm 14 is connected to a valve operating rod 17 which includes a portion 18 which extends down into the valve 12.

Referring to FIG. 2, the butterfly valve 12 may be more particularly characterized as comprising a valve body 19 having a cylindrical bore 20 formed therein as provided by a bore wall 21. A fluid inlet nipple 22 extends from one end of the valve body 19 and a fluid outlet nipple 23 extends from the opposite end, both nipples being in fluid communication with the bore 20 to provide a flow passage through the valve 12.

Portion 18 of the operating rod 17 extends through a bore 24 formed in the valve body 19 and a far end of the rod indicated at reference numeral 26 is journaled in a cylindrical recess 27 disposed as nearly as practicable in axial alignment with the bore 24. An O-ring 28 is housed in a counterbore 29 to provide a seal around the rod 17. When the valve 12 is assembled on the bracket 13 by means of suitable fasteners such as threaded screws or the like indicated at 30 the underside of the bracket overlies a flat 31 formed on the valve body 19 and maintains the O-ring 28 snugly within the counter bore 29.

The valving member of the butterfly valve 12 comprises a disc-shaped valve plate indicated generally at reference numeral 32 and disposed within the bore 20. The valve plate 32 is connected in fixed assembly to portion 18 of the rod 17 and rotates with the rod 17 when the rod is actuated by the vacuum motor 11.

Referring to FIG. 3, when the valve plate 32 is in the position therein shown in serves to block flow through the bore 20, but when rotated in a clockwise direction it unblocks the bore 20 and establishes a flow path between the fluid inlet 22 and outlet 23. The valve plate 32 is referred to herein as having a generally planar configuration, and although it has a thickness in a cross-sectional direction the use of the term "planar" is useful in connoting the overall disc-shaped configuration of the valve plate.

One aspect of the present invention resides in the disposition of the valve plate 32 in the closed position thereof. One characteristic of most butterfly valves is that they achieve substantially 100 percent of rated flow when the valve plate has rotated to a position at which the included angle between the axis of the valve bore and the plane of the valve plate is about 30°. In butterfly valves of the prior art the valve plate extends substantially transversely of the bore axis in the closed position thereof and thus must rotate approximately 60° to a substantially full open position.

In contrast, however, and in accordance with the principles of this invention, the valve plate 32 extends at an angle of 60° to the axis of the bore 20 in the closed position thereof. Thus in moving to the substantially full open position thereof the valve plate 32 need rotate only 30°. This reduction in the rotational requirement between full close and full open is particularly significant since certain valve power mechanisms such as the vacuum motor 11 as shown in FIG. 1 need then provide a relatively short stroke. Of course the short stroke requirement is also significant when considering the utilization of other power mechanisms such as solenoids and thermostatic elements such as bimetal, liquid expansion, vapor pressure and wax expansion.

It is noted that the axis of the operating rod 18 indicated at reference numeral 35, if offset with respect to the axis of the bore 20. In FIG. 3 the broken line 33 represents the axis of bore 20. Broken line 34 extends in parallel relation to line 33 and passes through the axis 35 of the operating rod 18. The distance between lines 33 and 34 is represented by reference character E.

Another line indicated at 36 extends normal to the general configurative plane of the valve plate 32 and intersects the axis 35 of the operating rod 18. Situated in spaced parallel relation to the line 36 is another line 37 which passes through a point P located at the center of the valve plate 32. The point P is also the effective point at which the line of total force F due to fluid pressure on the upstream side acts on the valve plate 32, as will be understood by those skilled in the art.

The distance D between lines 36 and 37 produces a moment F X D about the axis of rod 18 which tends to rotate the valve plate 32 counterclockwise as viewed in FIG. 3 or to a closed position. As the pressure of fluid upstream of valve plate 32 increases this moment F X D increases correspondingly.

In the assembly 10 shown in FIG. 1 the valve 12 is normally open. The valve closes when the motor 11 is subjected to a vacuum. As the force required to maintain the valve in a closed position increases the vacuum requirements or the size of the motor 11 could be increased. Because of the moment F X D, however, an increase in fluid pressure upstream of the valve plate 32 in and of itself tends to increase the closing force acting on the valve plate, thus minimizing the power requirements of the vacuum motor 11.

The offset relation of the axis 35 of the operating rod 18 and the axis of the bore 20 is meritorious for another reason. Referring to FIGS. 3 and 4, the valve plate 32 comprises a pair of end walls 38 and 39 arranged in spaced parallel relation and a peripheral wall 40 interconnecting the end walls 38 and 39. Thus the overall thickness of valve plate 32 in general is the distance between end walls 38 and 39.

The diameter of the bore 20 is the maximum dimension thereof. In the closed position of the valve plate 32 an annular portion 41 of the peripheral wall 40 sealingly engages the bore wall 21 and the maximum dimension of annular portion represents the maximum overall dimension of the valve plate 32 in a plane parallel to the general plane of the valve plate. Now, as the valve plate is rotated from a closed to an open position an interference develops between the peripheral wall 40 particularly portion 41, and the bore wall 21. If the axis of rotation of the valve plate 32 where made to coincide with the central axis of the valve plate 32, such interference would be most pronounced since the widest part of the valve plate would be moved to a narrower portion of the bore 20. By offsetting the axis of rotation of the valve plate 32, however, as is shown in FIG. 3, the widest portion of the valve plate 32 is moved into a wider portion of the bore 20 as the valve plate is rotated from a closed to an open position, thus substantially reducing interference between the peripheral wall 40 and the bore wall 41 to decrease wear on the valve plate and to increase the useful life of the valve.

Another feature of the valve plate 32 involves the formation of a lip seal on the upstream side thereof. For convenience in description that portion of the valve plate 32 situated above the operating rod 18 as viewed in FIG. 3 is referred to as the trailing portion of the valve plate, whereas that portion below rod 18 is referred to as the leading portion.

The end wall 38 has a recess 42 formed therein which extends over a major part of the trailing portion of the valve plate and down into the leading portion. The recess 42 and the peripheral wall 40 form a lip seal 43 at the periphery of the end wall 38 extending around a major portion thereof.

The lip 43 comprises a sidewall 44 inclined at an angle to the end wall 38. The configuration of the lip seal 43 is such that the radial component of the forces acting on wall 44 due to inlet pressure, which radial forces tend to bias the lip seal into snug sealing engagement with the bore wall 21, are sufficiently greater than the forces acting on the lip seal in a direction parallel to the axis of the bore 20, which forces tend to urge the lip seal 43 away from the bore wall 21, so that a leakproof seal is maintained between the lip seal 43 in the bore wall 21.

The lip seal 43 does not continue completely around the leading portion of the valve plate 32 since the forces acting on that portion of the valve plate tend to urge the peripheral wall 40 toward rather than away from the bore wall 21.

An arcuately-shaped transition wall portion 46 interconnects the end wall 38 and the peripheral wall 40 to insure snug engagement of the annular portion 41 of the peripheral wall 40 with the bore wall 21. The peripheral wall 40 is sloped away from the bore wall 21 which provides a back rake to enable the forces acting on the end wall 38 and the lip seal 43 to progressively increase the axial extent of the peripheral wall 40 in contact with the bore wall 21 as the fluid pressure upstream of the valve plate 32 increases.

In order to provide maximum sealing the valve plate 32 is made of resilient material such as a rubber. A metal insert 47 is embedded within the rubber for purposes of mounting the valve plate 32 on the operating rod 18.

The metal insert 47 comprises a central portion 48 curved somewhat complementarily to the shape of the operating rod 18 but including a portion 49 which is substantially flattened. The metal insert is welded to the operating rod 18 as indicated at reference numeral 50 and the welding operation is performed while the valve plate 32 and the operating rod 18 are both situated within the bore 20. The flattened portion 49 on the metal insert 47 facilitates the welding operation by reducing the tolerances required between the exact positioning of the operating rod and the valve plate.

For example, in quantity production the bores 24 and 27 formed in the valve body 19 may be slightly axially misaligned. Such misalignment may cause a slight change in the disposition of the operating rod 18 relative to the valve plate 32. Because of the flattened portion 49, however, the operating rod 18 may be welded to the valve plate 32 such that the valve plate is properly disposed in the bore 20 regardless of such minor misalignment.

For convenience in performing the welding operation a central bore 51 is formed in the valve plate 32 to expose the metal insert to the upstream side of the valve plate 32. A pair of chaplet holes 52 and 53 are formed in the valve plate 32 merely to assist in the location of the metal insert 47 in the mold in which the valve plate 32 is formed. A button 54 is formed in the recess 42 opposite the chaplet hole 53 to rigidify the valve plate at that location.

Although minor modifications might be suggested by those versed in the art, it should be understood that we wish to embody within the scope of the patent warranted hereon all such modifications as reasonably come within the scope of our contribution to the art.

We claim:

1. A butterfly fluid flow valve comprising:
   a valve body having a cylindrical bore wall forming a bore therethrough and a fluid inlet and a fluid outlet communicating with said bore;
   an operating rod rotatably mounted on said valve body and extending into said bore in a direction normal to the direction of said bore;
   a disc-shaped valve plate having a generally planar configuration disposed within said bore and connected in fixed assembly to said operating rod to rotate therewith about the axis of said rod between a closed position at which said valve plate blocks off said bore to prevent flow therethrough to an open position;
   the included angle between the axis of said bore and the plane of the valve plate in the closed position thereof being substantially less than 90°,
   means forming aligned bores in said valve body at the opposite sides of said bore wall for receiving and journaling said operating rod;
   said valve plate comprising a resilient member and a metal insert embedded in said resilient member; and
   a portion of said metal insert being exposed to said operating rod for a weld connection therewith, the exposed portion of said metal insert being generally arcuately shaped but having a substantially flat portion extending transversely to the axis of said operating rod to receive said rod and to accommodate variations in the position of said rod due to misalignment of said journaling bores.

2. A vacuum actuated butterfly fluid flow valve comprising:
   a vacuum motor having a movable operating member mounted thereon;
   a valve body having a cylindrical bore wall forming a bore therethrough and a fluid inlet and a fluid outlet communicating with said bore;
   an operating rod rotatably mounted on said valve body and extending into the bore in a direction normal thereto;
   said operating member being operatively connected to said operating rod to rotate same upon actuation of said vacuum motor;
   a disc-shaped butterfly valve plate having a generally planar configuration disposed in said bore and connected in fixed assembly to said operating rod to rotate therewith about the axis thereof between open and closed positions;
   the included angle between the axis of said bore and the plane of the valve plate in the closed position thereof being substantially less than 90°, and
   said valve plate being so constructed and arranged that the line of force due to fluid inlet pressure acting on said valve plate in the closed position thereof and extending in a direction normal to said valve plate is offset with respect to a line normal to said valve plate passing through the axis of rotation of said operating rod to provide a moment arm pending to rotate said valve plate further to the closed position thereof.

3. A fluid flow valve comprising:
   a valve body having a bore wall forming a flow passageway;
   a butterfly valve member in said passageway;
   an operating rod mounted on said valve body for pivoting said valve member in said flow passageway;
   means forming aligned bores in said valve body at the opposite sides of said bore wall for receiving and journaling said operating rod; and
   said valve plate comprising a resilient member and a metal insert embedded in said resilient member, a portion of said metal insert being exposed to said operating rod for a weld connection therewith, the exposed portion of said metal insert being generally arcuately shaped but having a substantially flat portion extending transversely to the axis of said operating rod to receive said rod and to accommodate variations in the position of said rod due to misalignment of said journaling bores.

4. A fluid flow valve comprising:
   means including a cylindrical bore wall forming a unidirectional fluid flow passageway;
   a disc-shaped butterfly valve member disposed crosswise in said passage; and
   means for pivoting said valve member in said passageway;
   said valve member being made of resilient material and having first and second parallel end walls respectively forming the upstream and downstream sides of said valve member and a circumferentially continuous peripheral wall interconnecting said end walls, said peripheral wall having a central portion which is straight in transverse cross section and which slopes away from said cylindrical bore wall in a downstream direction to provide a back rake, and an arcuately shaped transition wall portion which interconnects said central portion and said one of said end walls forming said upstream side of said valve member,
   said transition wall portion being adapted to engage said cylindrical bore wall in the closed position of said valve member to provide a circumferentially continuous sealing edge of the upstream side of said valve member.